Figure 1:
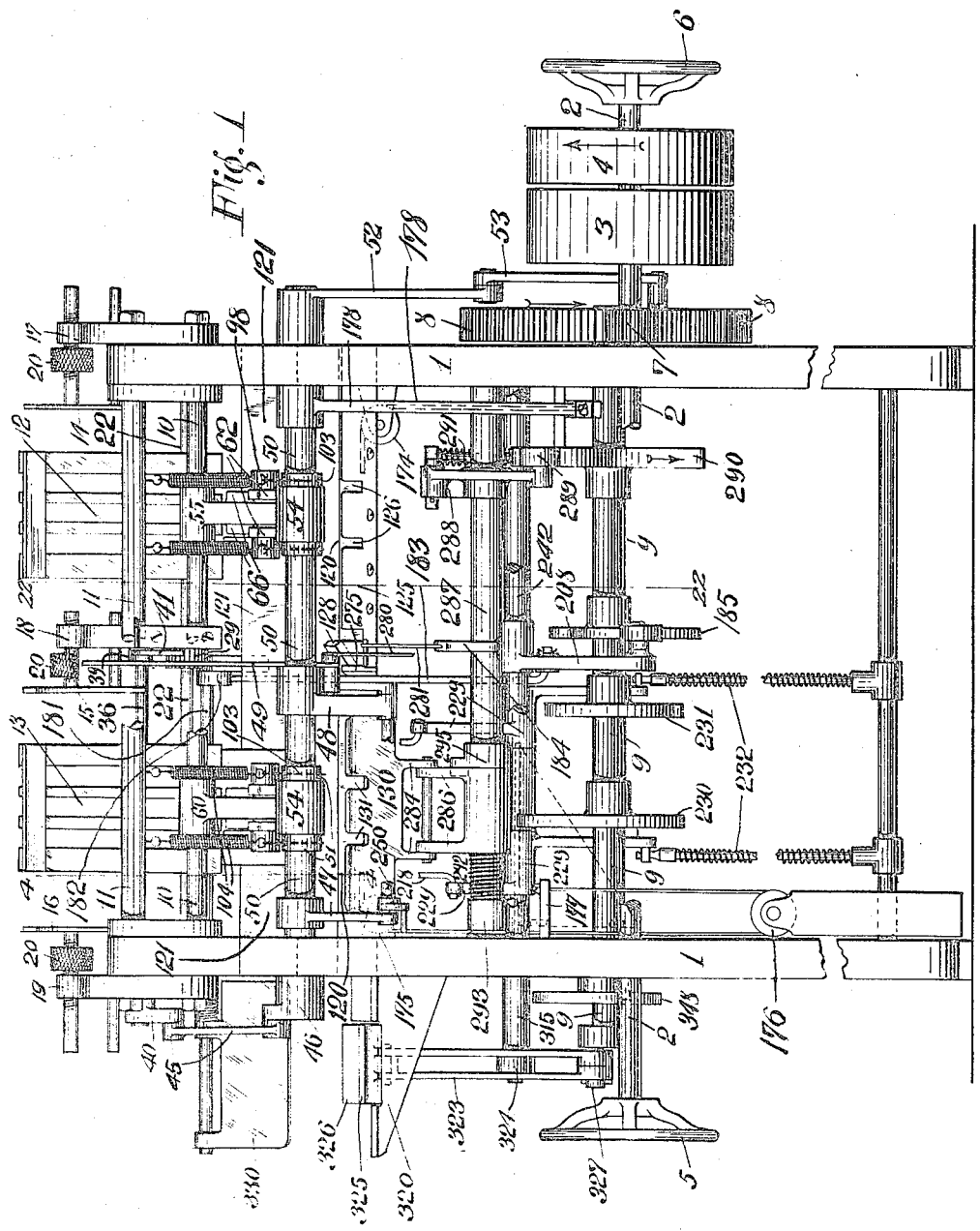

W. F. MARRESFORD.
SHEET GATHERING MACHINE.
APPLICATION FILED DEC. 14, 1904.
1,173,203.
Patented Feb. 29, 1916.
12 SHEETS—SHEET 5.
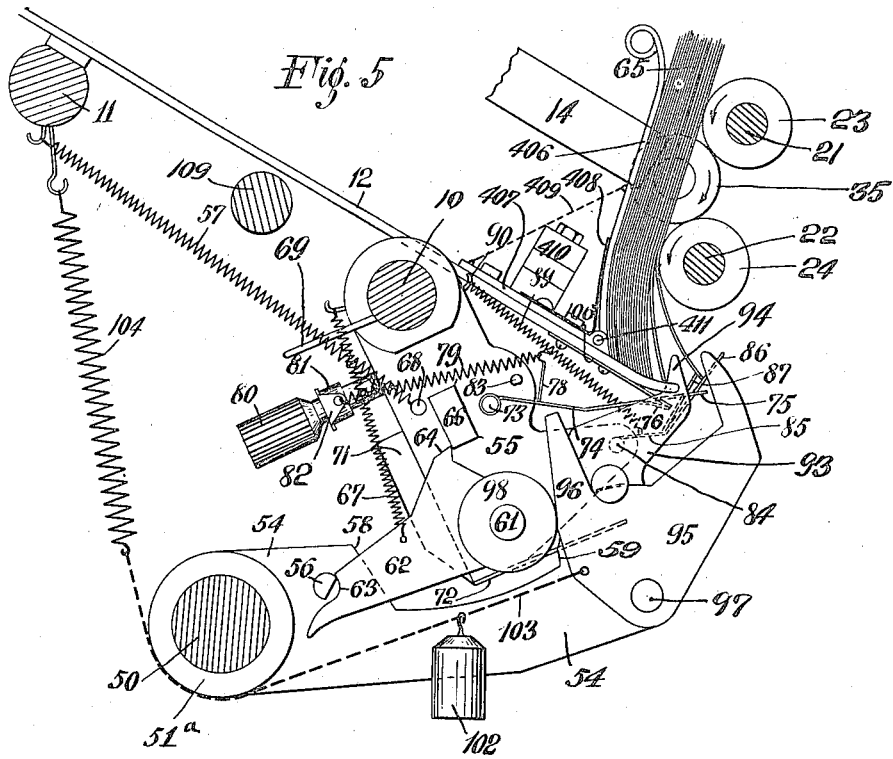
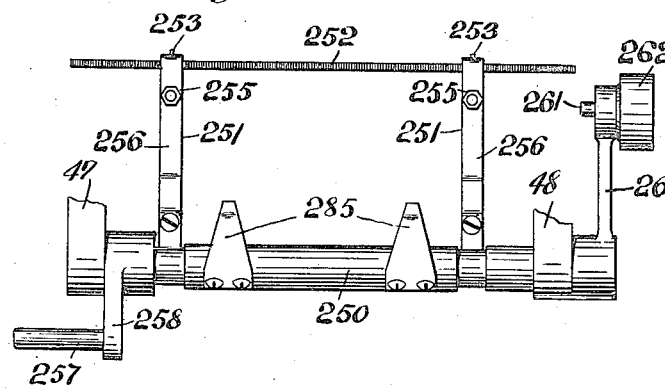
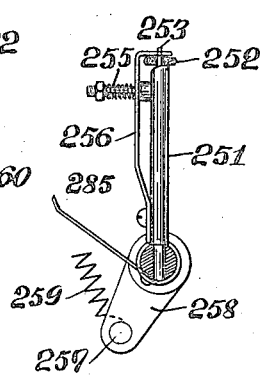

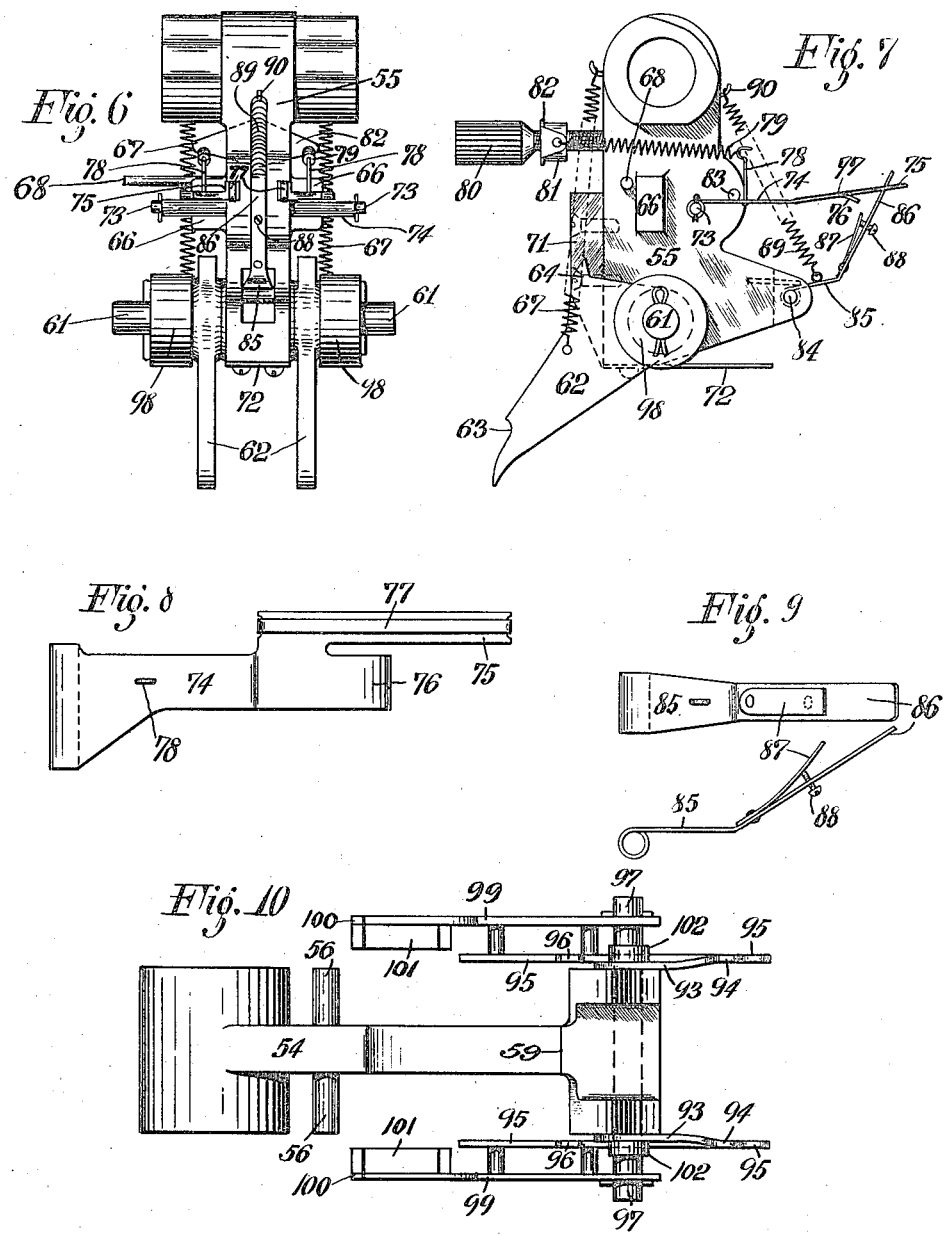

W. F. MARRESFORD.
SHEET GATHERING MACHINE.
APPLICATION FILED DEC. 14, 1904.
1,173,203.
Patented Feb. 29, 1916.
12 SHEETS—SHEET 7.
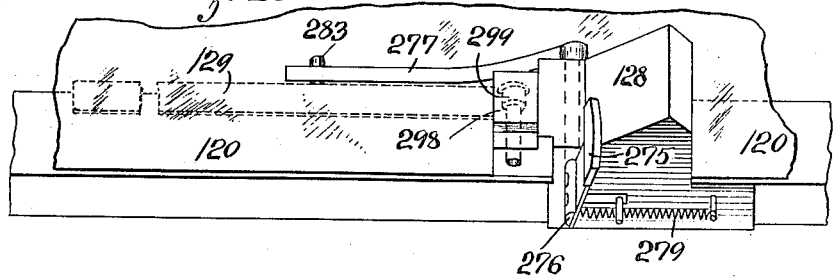
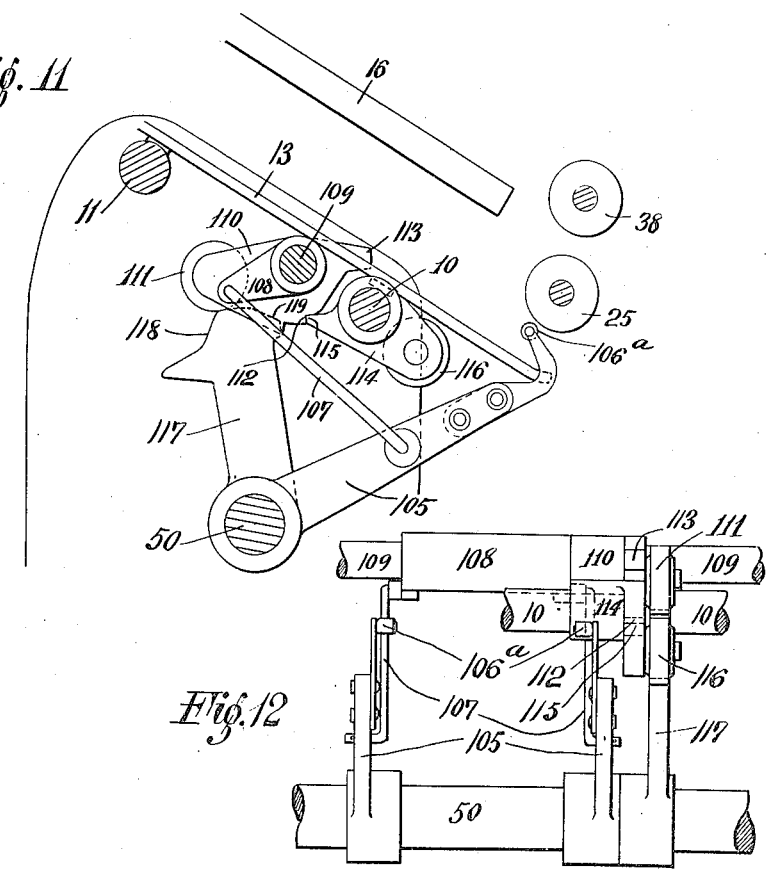

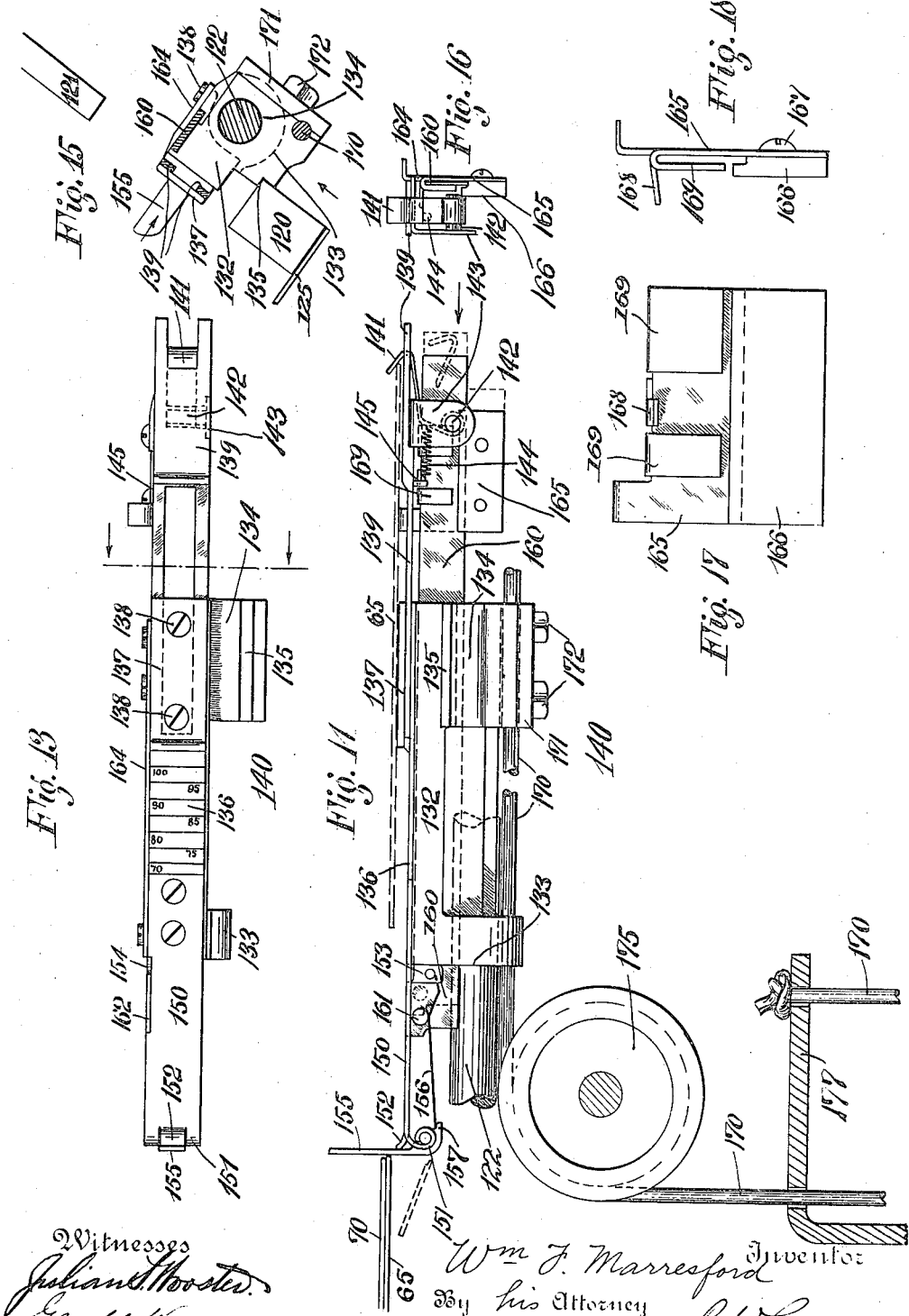

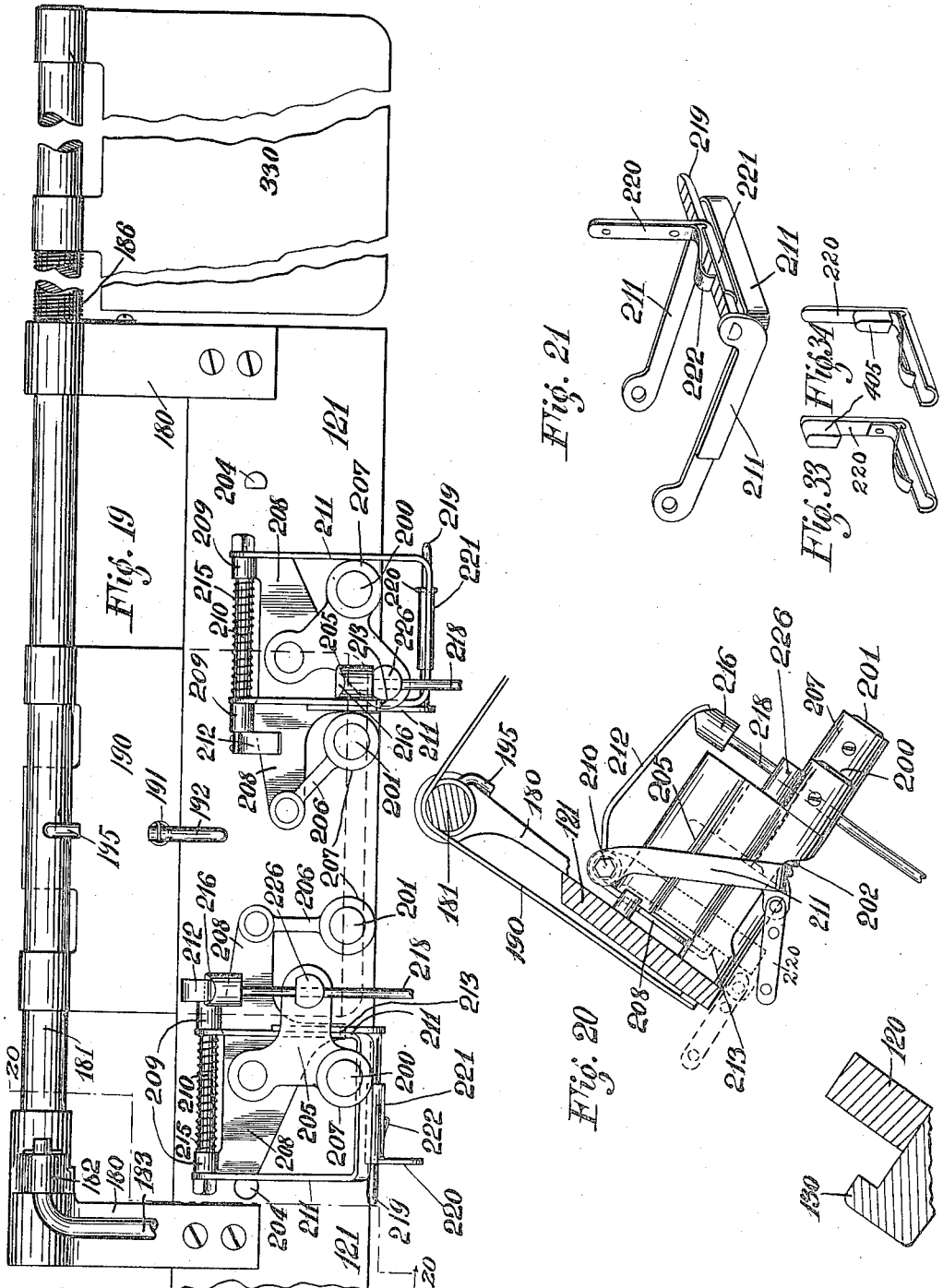

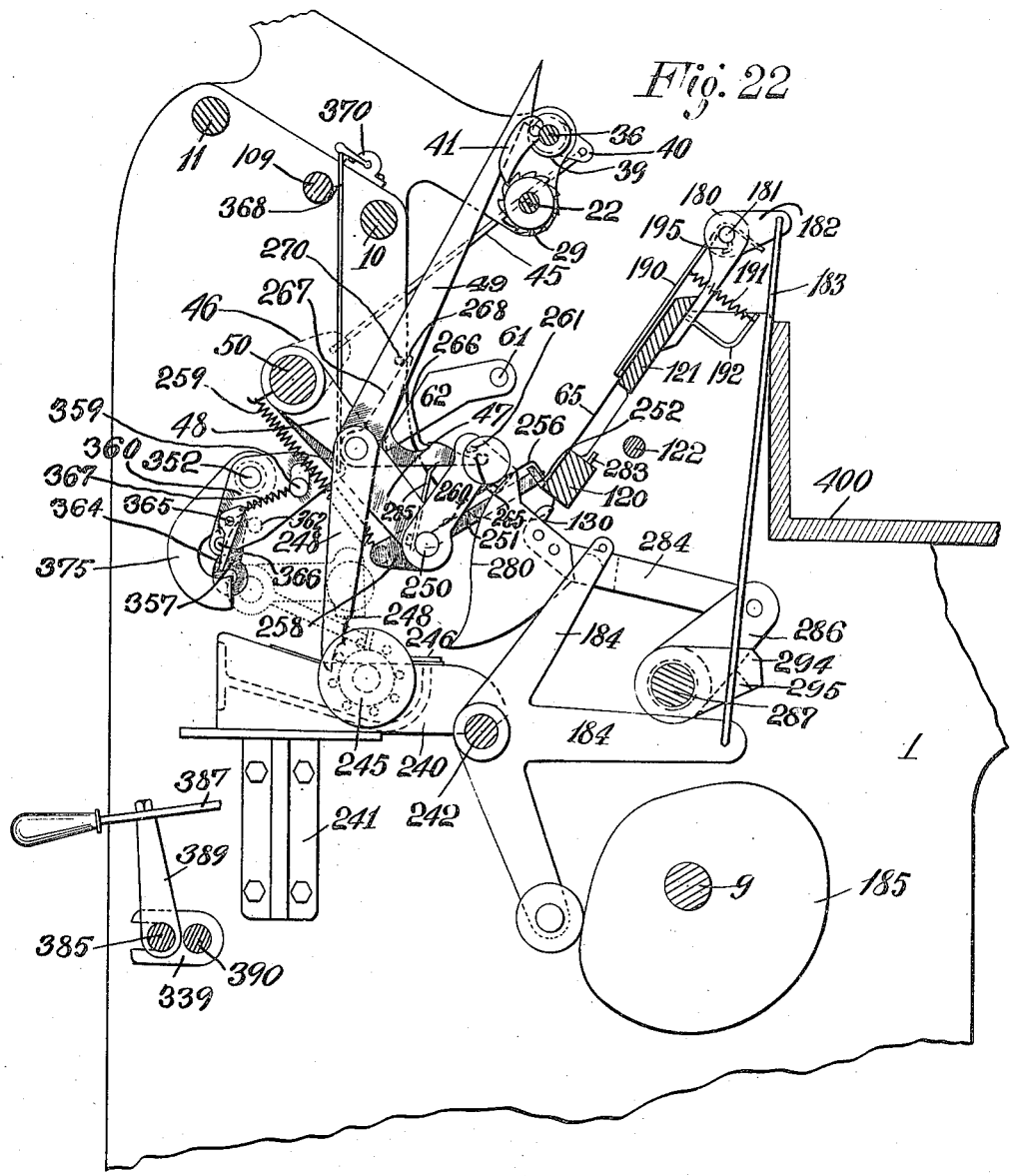

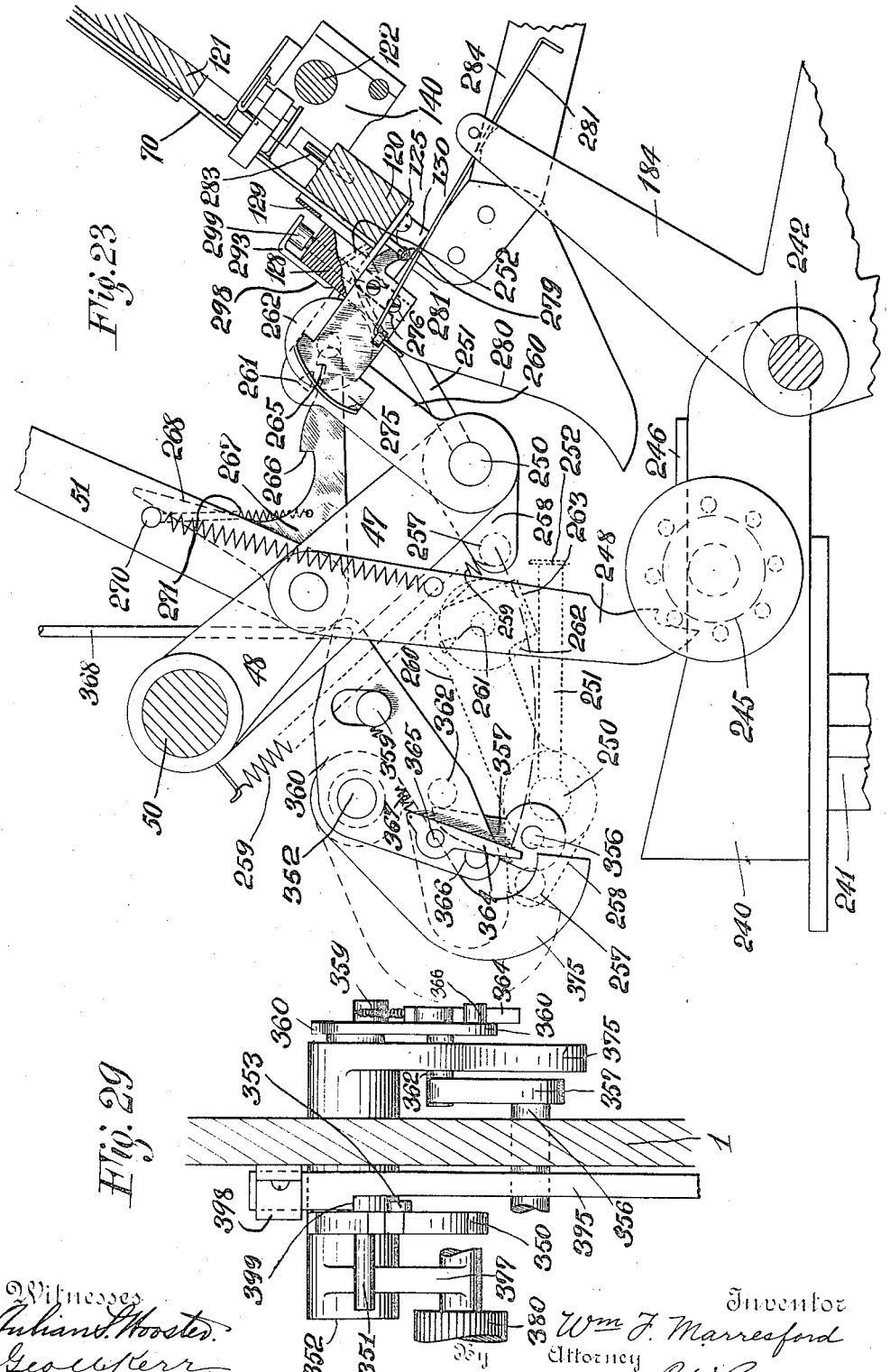

W. F. MARRESFORD.
SHEET GATHERING MACHINE.
APPLICATION FILED DEC. 14, 1904.
1,173,203.
Patented Feb. 29, 1916.
12 SHEETS—SHEET 12.
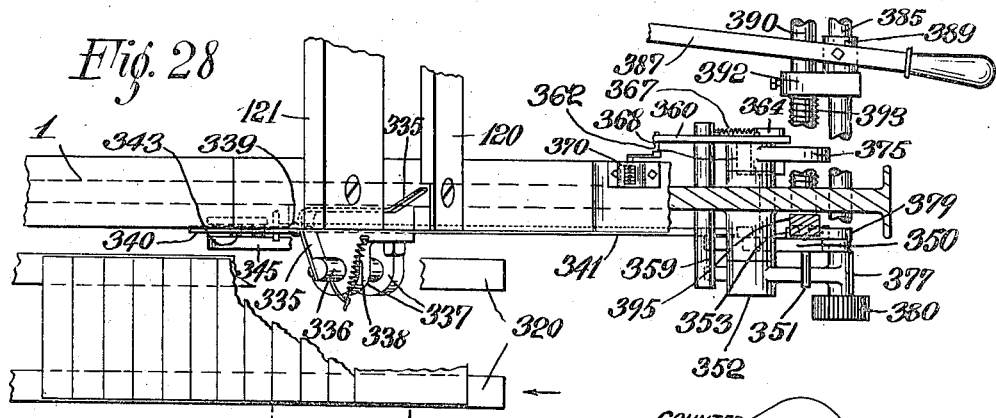
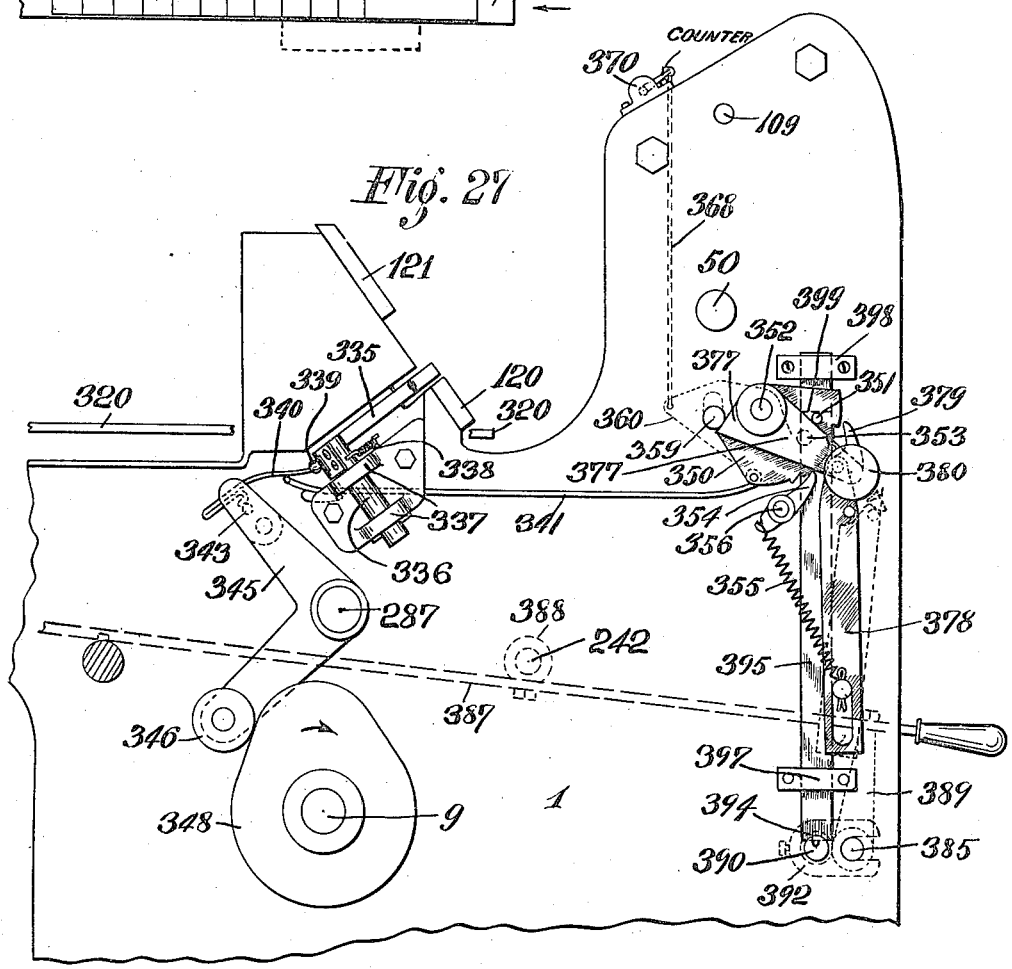

ically prevent the mechanism from acting upon
UNITED STATES PATENT OFFICE.

WILLIAM F. MARRESFORD, OF BROOKLYN, NEW YORK.

SHEET-GATHERING MACHINE.

1,173,203.

Specification of Letters Patent. Patented Feb. 29, 1916.

Application filed December 14, 1904. Serial No. 236,797.

*To all whom it may concern:*

Be it known that I, WILLIAM F. MARRESFORD, a citizen of the United States, residing at Brooklyn, in the county of Kings and State of New York, have invented certain new and useful Improvements in Sheet-Gathering Machines, of which the following is a full, clear, and exact specification.

This invention relates generally to machines for use in the bookbinding art, and its object is to provide a machine which shall be adapted to perform the various operations of receiving or selecting the printed and unprinted sheets, illustrations, etc., that go to make up a book, bringing these selected sheets, etc., into proper consecutive relation to one another, attaching them together, counting the attached parts, and discharging the same from the machine in a manner suitable for convenient removal.

The invention also includes other features, such as means whereby in the event of any of the sheets or parts operated upon not being brought to their proper positions at the proper time the machine will automatically prevent the mechanism from acting upon and injuring the remaining sheets or parts; prevent the counting mechanism from counting incomplete or imperfect groups of attached parts; discharge the incomplete or imperfect groups in a different place from that where the perfected and counted groups are discharged; cause the machine to immediately resume its normal functions without stopping and without adjustment by the attendant; and cause the machine to stop and signal the attendant in case of continued consecutive failure for a predetermined number of times to properly perform all of its desired functions.

A further object is to provide a machine of the character above referred to, which shall be readily adjusted for work of various sizes and kinds, and which shall furthermore be as automatic as possible in its various operations, requiring little attention after starting, aside from supplying the machine with materials with which to work, and removing the completed product.

In the following description I will employ the general term "sheets" to designate the book elements or material of whatever nature the machine is intended to operate upon. This material usually consists of printed or unprinted sheets, often previously folded or cut into single leaves, of an approximately uniform page size, including illustrations on separate sheets with or without tissue paper attached, single title pages printed in color, etc. I also employ the general term "paste" to designate whatever variety of adhesive or fastening means may be employed, including wire of the kind well known and used in the art.

The machine generally comprises a series of inclined chutes side by side in which the various sheets are placed, preferably upon edge, the upper portion of the sheets being preferably inclined slightly forward, and each chute containing sheets of one kind. From these chutes one sheet of each kind is removed by suitable separating mechanism and brought simultaneously to a given receiving support, upon which the sheets are moved and registered for bringing them into proper position to be pasted, or otherwise fastened, counted and discharged. As many chutes will be employed as there are varieties of sheets in a given book, but for the sake of clearness in description I have shown a machine containing only two chutes, in which case paste would need to be applied to only one of the sheets and therefore only one pasting mechanism is shown. It will be understood that for each additional chute an additional pasting mechanism will be required.

The invention will be described with reference to one form thereof, shown in the accompanying drawings.

Figure 2:
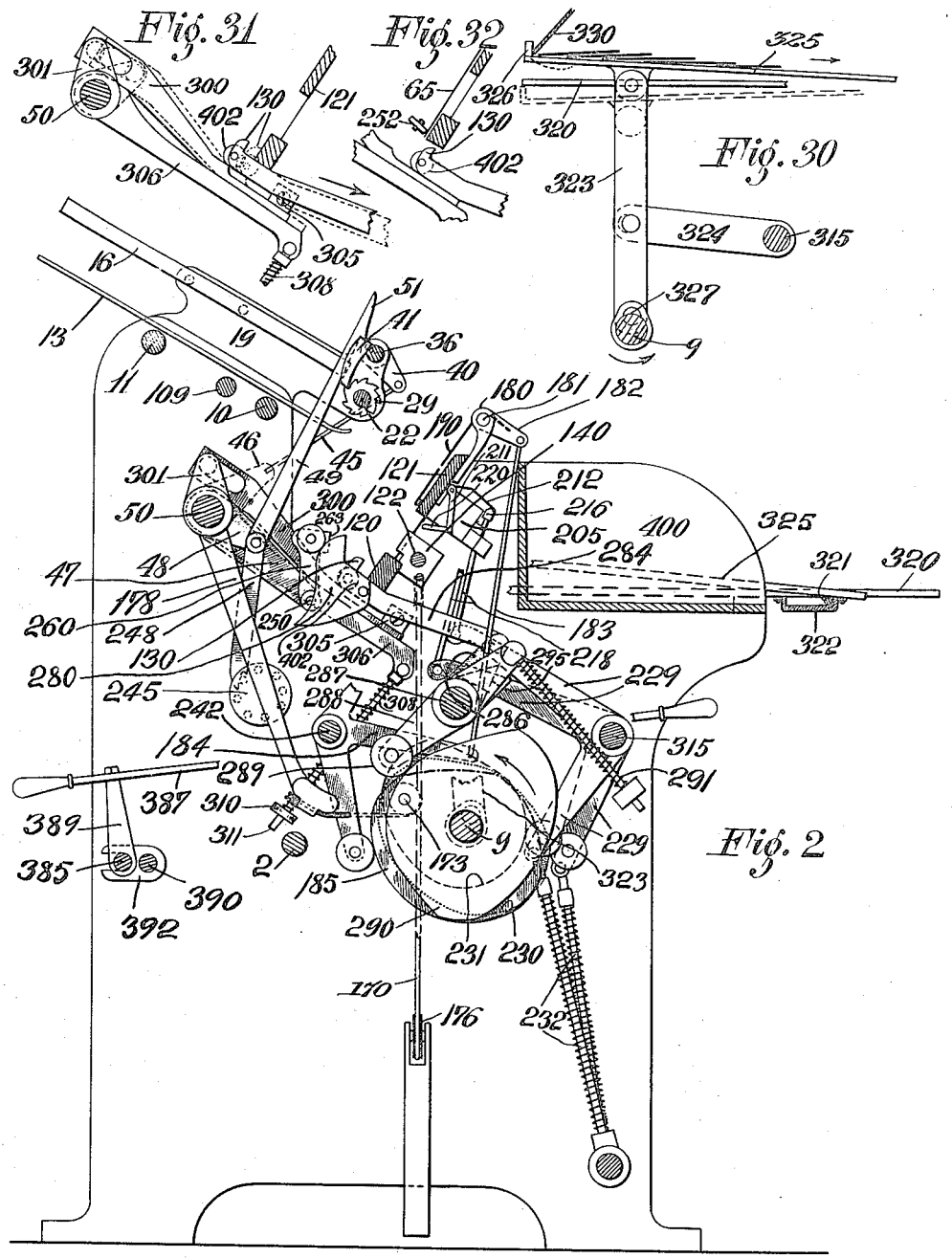
Figure 3:
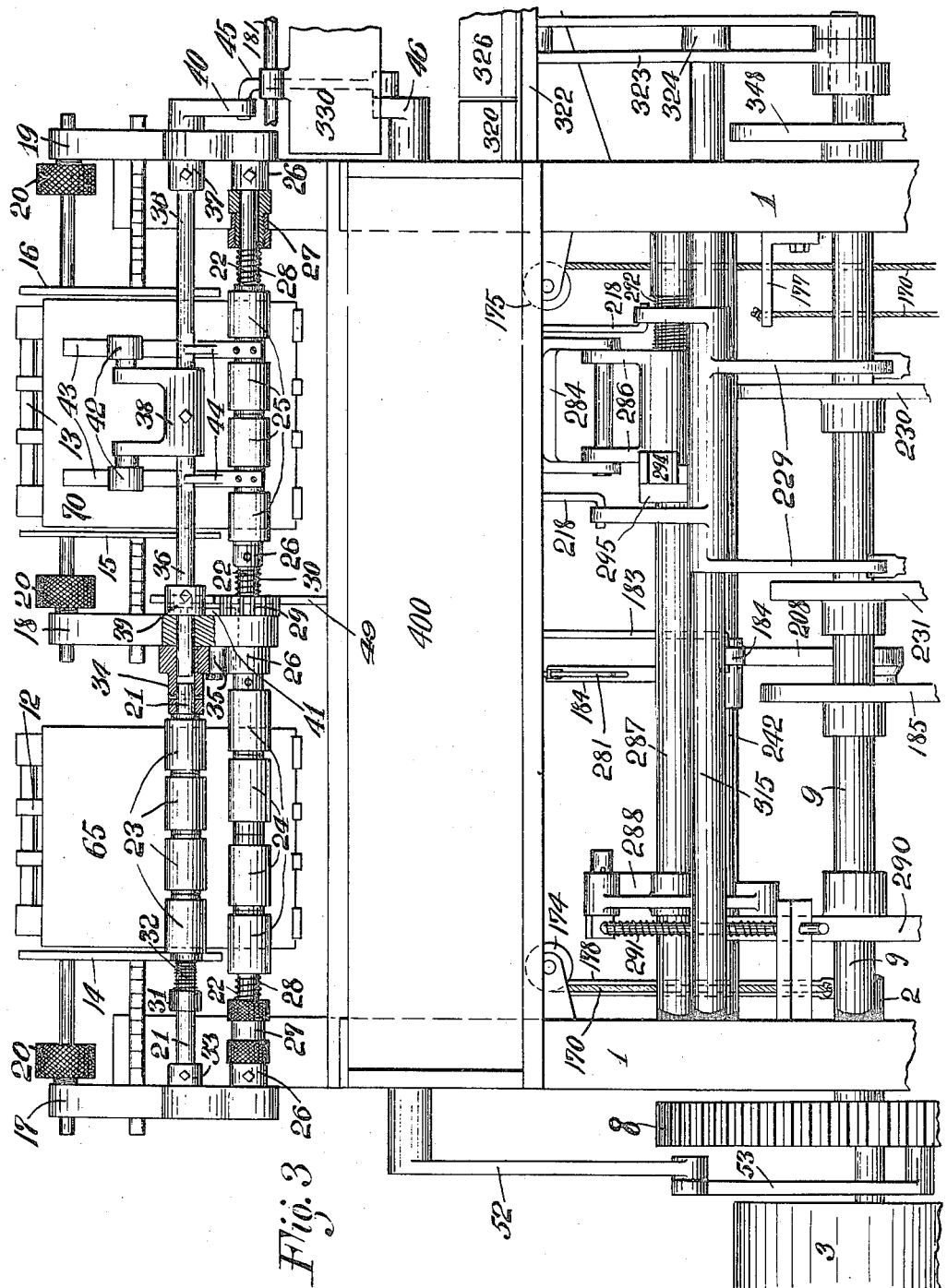
Figure 4:
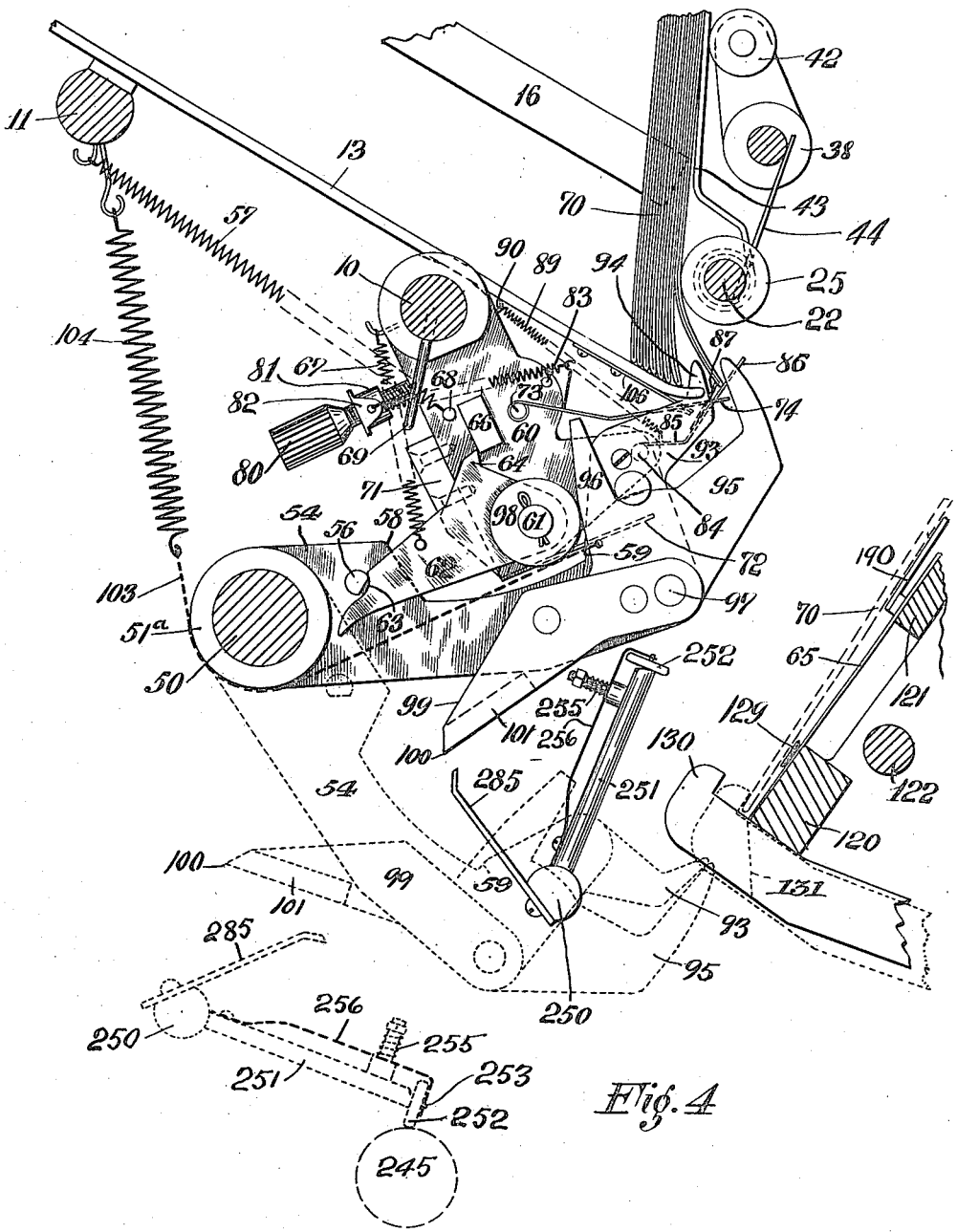

In these drawings, Figure 1 is a rear elevation of the machine containing only two chutes, and with some of the parts removed for the sake of clearness. Fig. 2 is a side view from the right of Fig. 1, showing more particularly the means for applying power to the various parts of the machine. Fig. 3 is a front view of the machine. Fig. 4 is a detail view of the separating mechanism on the side of the machine where the pasting mechanism is located. Fig. 5 is a detailed view of the separating mechanism on the side opposite the pasting mechanism. Figs. 6, 7, 8, 9 and 10 are detail views of parts of the separating mechanism. Figs. 11 and 12 are additional views of parts of the separating mechanism. Figs. 13 and 14 are plan and side views respectively of the sheet moving conveyer. Fig. 15 is a section of the conveyer, showing its relation to its supporting bars. Figs. 16, 17 and 18 are detail views of parts of the conveyer. Fig. 19 is a front view of the sheet registering mechanisms, and the clipper and dropping plates. Fig. 20 is a side view of the left hand sheet registering mechanism. Fig. 21 is a view of the adjustable registering finger and its mounting. Fig. 22 is a general view of the pasting, clamping, sheet supporting, counting and throw-off mechanism. Fig. 23 is a large detail view of the pasting and tripping mechanism. Figs. 24 and 25, Sheet 5, are detail views of the paster bar and its mounting. Fig. 26, Sheet 7, is a detail view of a part of the paster tripping and adjusting mechanism. Fig. 27, Sheet 12, is a view of the controlling devices for stopping the machine and for placing the imperfect work. Fig. 28, Sheet 12, is a plan view of the mechanisms shown in Fig. 27. Fig. 29, Sheet 11, is a rear elevation of a part of the mechanism shown in Fig. 27. Fig. 30, Sheet 2, is a detail view of the movable bed of the receiving table and its operating connections. Figs. 31 and 32, Sheet 2, are views showing different positions of the clamp and its supporting bar. Figs. 33 and 34 are views of the registering fingers.

*Separating mechanism*—Referring to Fig. 1: 1, 1, represents the side frames of the machine, which are suitably fastened together by cross rods to form a rigid structure, upon which the operative parts are mounted. 2, is the driving shaft carrying the usual fast and loose pulleys 3, 4, the hand-wheels 5 and 6, and the pinion 7. The pinion 7 drives the gear 8 on the one revolution main shaft 9, from which latter the various parts of the machine are operated through cams mounted thereon and other connections to be hereinafter described.

Mounted on the cross rods 10 and 11 and inclined downwardly toward the front of the machine are chutes 12 and 13, which with the adjustable side bars 14, 15 and 16 form receptacles for the sheets 65 and 70 that are to be operated upon. (See Figs. 1, 2 and 3.) The side bars have supporting rods passing through suitable bearings in brackets 17, 18 and 19 secured to the frames, and are held in position by lock nuts 20; one rod of each bar is graduated for convenience in adjusting to suit the various sizes of the sheets.

In Figs. 3, 21 and 22 represent intermittently rotated shafts on which the rollers 23—23—23—23, 24—24—24—24 and 25—25—25—25 are frictionally mounted. Shaft 22 extends entirely across the machine, and carries thrust collars 26, adjusting sleeves 27 and springs 28 for applying tension to the rollers; also ratchet 29 and spring 30 for causing the ratchet to bind on bracket 18. Shaft 21 ends near the middle of the machine; it carries thrust collar 31 and spring 32 for applying tension to the rollers; also stop collar 33 and sleeve 34. Shaft 21 receives motion from shaft 22 through the medium of intermediate friction roller 35. Sleeve 34 on shaft 21 turns loosely on the end of a rock shaft 36, which carries stop collar 37, adjustable bifurcated arm 38, and collar arm 39. Shaft 36 is rocked through the medium of arm 40, pitman rod 45, arm 46, main rock shaft 50, arm 52, and pitman 53 connected to a crank pin on gear 8. Shaft 22 is intermittently rotated through ratchet 29 by two pawls 41 and 49 (Figs. 3, and 22). Pawl 41 is pivoted to arm 39 on rock shaft 36, and arm 48 on main shaft 50 carries pivoted pawl 49. Antifriction rollers 42—42 on bifurcated arm 38 bear against push fingers 43, which are loosely mounted on sleeves on shaft 22 between rollers 25—25; retaining springs 44—44 are secured to fingers 43—43, and bear on shaft 36.

Piles of sheets, represented by the numbers 65 and 70 (Figs. 3, 4 and 5) are placed on the chutes 12 and 13 are approximately centered therewith by means of bars 14, 15 and 16, and bear against the rollers 23—23—23—23 on one side of the machine and against rollers 25—25—25—25 and fingers 43—43 on the other side of the machine.

Rigidly mounted on main rock-shaft 50 are the arms 54—54, (Figs. 1, 4 and 5 and 10). Loosely mounted on cross rod 10 relatively to arms 54—54 are the swinging arms 55 and 60, (Figs. 6 and 7) which are substantially duplicate in form and in the parts they carry, so it will be sufficient to describe arm 55. Pivotally mounted on a stud 61 on each of arms 55 and 60 is a dog 62 having a notch 63 and a projection 64 engaging a lug 66 on arm 55. A supporting spring 67 connects dog 62 and the hub of arm 55, to hold notch 63 in engagement with pin 56 on arm 54. A spring 57 connects cross rod 11 and arm 55 for holding the latter in a normally retracted position, at which time pin 68 is in contact with stop pin 69 projecting downwardly from cross rod 10, and the buffer 71 on arm 55 is in contact with shoulder 58 on arm 54. A spring 72 mounted on arm 55 engages notch 59 of arm 54, to prevent rebounding of arm 55.

Pivotally mounted on pins 73 at each side of the arm 55 are fingers or spreaders 74. Each spreader comprises a shank portion and two ends 75, 76. (Figs. 8 and 7). The end 75 is faced with a strip of rubber or other suitable material 77, conveniently held by notches at each end, and may be an ordinary flat elastic band which can easily be renewed. The shorter end 76 is bent downwardly and serves to contact at certain times with plate 106 secured to the bottom of chutes 12 and 13.

78 is a pin to which a spring 79 is attached.

80 is an adjusting screw to which collar 81 is rigidly secured. Loosely mounted on screw 80 is a plate 82 to the opposite ends of which are attached the springs 79, 79. By adjusting the screw the tension of the springs 79 is controlled.

83 is a stop-pin to limit the upward movement of the spreaders 74.

Pivoted at 84 on the arm 55 is a picker 85 (Figs. 9 and 7) having the end 86 and stop 87, and controlled by a spring 89 attached to the arm 55 at 90.

88 is a screw for adjusting the depth of the stop 87.

Referring to Figs. 4 and 10: 93 is a jaw rigidly mounted on arm 54, and having an offset portion 94. 95 is a movable jaw pivoted on stud 97 and contacting intermittently with the offset portion of jaw 93. Jaw 95 has a cam portion 96, against which a roller 98 on stud 61 bears. Jaw 95 also has an extension 99 having a point 100 and carrying a counterweight 101, the counterweight tending to hold jaw 95 in contact with jaw 93. 103 is a cable attached to jaw 95, passing around collar 51ª loosely mounted on shaft 50 and attached to spring 104, which is attached to cross rod 11, and tends to hold jaw 95 in contact with jaw 93. The jaws and connections on arm 54 (Fig. 5) are the same as on arm 54 (Fig. 4) except that movable jaw 95 has no extension 99, and the counterweight 101 is replaced by the counterweight 102 suspended from the cable 103.

On main rock shaft 50 are loosely mounted pairs of arms 105—105 carrying anti-friction rollers 106ª—106ª. (Figs. 11 and 12.) Each pair of arms 105—105 is connected through links 107—107 with a bifurcated arm 108, secured to the rock shaft 109 journaled in the side frames 1—1. Rock shaft 109 has an arm 110 carrying roller 111; arm 110 has a notch 112 and a projection 113; projection 113 serves only to contact with cross rod 10 to limit the motion of arm 110. Loosely mounted on cross rod 10 is the pawl 114 with a point 115 to engage notch 112 in arm 110; pawl 114 carries anti-friction roller 116. Secured to main rock shaft 50 is the cam 117 with inclined surfaces 118 and 119, serving to contact in turn with rollers 111 and 116.

The operation of the parts thus far described is as follows:—Through power applied to fast pulley 3 (Fig. 1) the shaft 2 and pinion 7 are rotated, thus driving gear 8 in direction indicated by arrow; through pitman 53 and arm 52 shaft 50 is rocked, carrying arms 54, 54, 48 and other parts secured thereon with it, between the limits indicated approximately for the said parts by the solid and dotted lines in Figs. 4, 22 and 23, the total rocking movement of shaft 50 and the parts upon it covering an arc of approximately 60°. As arm 48 nears the limit of its downward motion, pawl 51 engages the teeth of ratchet 29 and actuates the shafts 22 and 21, causing the rollers 25, 24, 23 (which may be covered with rubber or other suitable frictional material) to settle the sheets resting against them firmly against the chute. As the rollers are frictionally held on the shafts by the springs 28—28—32, the contact of the front sheet with the chute will stop the rollers, and the shafts will turn within the rollers until pawl 51 reaches the end of its motion. It will be understood that in practice there may be an unevenness in the piles of sheets as they are placed in the chutes, some of the sheets being in firm contact with the chutes, others slightly elevated all the way across, others elevated at one side. The action of the rollers and shafts as described above insures that the shafts as described above insures that the irregularly placed sheets shall all be brought in succession into firm and even contact with the chutes, without cramping or wrinkling the sheets. The tension on the respective rollers is adjusted to suit the thickness, (or weight, composition or other peculiarities) of the sheets. Rock shaft 50 having now reached the limit of its motion in one direction begins its return motion; this causes pins 56 on arms 54—54 to engage notch 63 in dogs 62, thus causing arms 55 and 60 to be actuated about cross rod 10. This movement carries spreaders 74 upward and forward, and the frictional coverings 77 engage the edge of the front sheet and push it free from the chute and carry it outward. As the sheet is pushed free from the chutes the shafts 22 and 21 and rollers 25—24—23 are again actuated, this time by pawl 41, giving the front sheet a slight additional downward movement for the purpose of causing its edge to force the spreaders away from possible contact with any sheets behind the front sheet.

It will be noted that the wedge shape assumed by the piles of sheets (Figs. 4 and 5) on account of the angle of the chutes with relation to the rollers and other supporting means at the front, together with the curve of the lower ends of the chutes, causes a natural advancement and partial separation of the front sheet, and the angles and curves are calculated and constructed with this end in view. This condition, in combination with the movements of the parts described above, insures the effective separation of the edge of the front sheet from its fellows in the pile. Now the picker 85 has meanwhile moved forward and upward until the stop 87 engages the front sheet, after which the bent ends 76 of the spreaders 74 contact with the plates 106, causing the forward ends of the spreaders to rock downward out of contact with the sheet. About this time rollers 98 come into contact with the cam portion 96 of the jaws 95. Further movement of the parts causes the jaws to open and the picker to carry the sheet out into position to be grasped by the jaws, as shown clearly in Figs. 4 and 5. The push fingers 43—43 and the anti-friction rollers 106ª—106ª on arms 105—105 will now have assumed the positions shown in Fig. 11; the object of this is to hold the pile of sheets substantially free from the front sheet, so that in being drawn away from the pile by the jaws the front sheet will not, through great frictional contact with the other sheets, tend to injure them or draw them with it; this, for instance, will prevent the ink on freshly printed sheets, and especially illustrations, from being offset and blurred by rubbing on one another, and signatures with loose cut or inserted leaves from having their loose leaves crumpled or partly pulled away from the others, tending to interfere with the successful operation of the machine at the next revolution. The arms 105—105 receive their motion at the proper time through rock shaft 109 and its connections from the cam 117 on rock shaft 50, acting against the roller 111 on arm 110; point 115 on pawl 114 engages notch 112 to retain arms 105—105 in position while the front sheet is being drawn free from the pile at which time the face 119 on cam 117 operates on pawl 114 through roller 116 to release the point 115 from notch 112, permitting the arms 105—105 and anti-friction rollers 106—106 to drop free from the pile to allow it to settle again to the forward position. Fingers 43 are also at that time retracted. At about the time when the arms 105—105 are, however, nearing their uppermost position, the projections 64 of dogs 62 engage lugs 66 on arms 55 and 60, and a slight further motion of arms 54—54 releases notch 63 from pin 56 and permits the jaws to close on the sheet, and the arms 55 and 60 and the parts carried by them to be moved by springs 104 and 57 to a rearward position with the spreaders and pickers out of the downward path of the sheet. At this time arms 54—54 begin their downward movement, carrying the separated sheets with them. As this movement progresses the tension of the springs 104 will be gradually relaxed as the cable 103 is unwound from about the collars 51, until the tension of springs 104 is entirely relaxed, and the jaws are kept lightly closed on the sheets only by the weight of the cable 103 and the counterweight 101. Thus absolute control of the sheets is kept until they are delivered to other parts of the machine. No mechanism is provided or needed for opening the jaws to release the sheets, as the jaws simply pass at the proper time through slots 131 in suitable supports, such as the plate 125 and presser 130 shown in Fig. 1 constituting stripping devices, and the jaws through their continued motion draw free of the sheets and leave them in position for the next operation. By this time the push fingers 43 and the anti-friction rollers 106ª—106ª on arms 105—105 will have operated to permit the pile to settle again into position for the separation of another sheet. The above described cycle of operation is now complete, and the separation of another sheet will at once begin by pawl 49 again coming into contact with ratchet 29.

It has been found possible in practice to so regulate the depth of the stop 87 of the picker 85 by means of the adjusting screw 88 as to separate the edges of the sheets without the use of the spreaders, but on very thin sheets, as when single sheets are used, or very soft paper, it has been found necessary to set it so fine that it becomes unreliable, and the spreaders then become the more effective separating agent, and the picker stop may be set very deep without relation to the precise nature of the sheets, serving more particularly to locate the edge of the sheet in proper relation to the gripping jaws.

*Conveying and registering mechanism.*—Mounted on the frame are the inclined bars 120 and 121, and the rod 122. (Figs. 1, 22 and 23). To the lower edge of bar 120 is secured the plate 125, (Fig. 1) having slots 126 through which the jaws on arm 54 pass to deliver the sheet 65. Near the middle of bar 120 is fastened block 128 on which is mounted the guide finger 129; block 128 and guide finger 129 are spaced from the bar 120 to permit the passage of sheets. (Fig. 23). A reciprocating and oscillating presser 130 is mounted in movable relation to the lower edge of bar 120 on the side opposite plate 125, and has slots 131 (Fig. 1) corresponding to slots 126 in plate 125 for the passage of the jaws on arm 54, which in this manner deliver the sheet 70.

For carrying the sheets step by step and later discharging them, I provide the conveyer 140. (Figs. 13 to 18, inclusive). The conveyer is composed of a main portion 132 having bearings 133 and 134 loosely fitting on rod 122 and a notch 135 slidably bearing on bar 120. Mounted on part 132 is a graduated index plate 136. Adjustably mounted on ways on index plate 136 and clamped in position by the plate 137 and screws 138—138 is the slotted plate 139, carrying the disappearing sheet-moving hook 141. Hook 141 is pivotally mounted on a stud 142 secured to a lug 143 depending from plate 130

139. The free end of hook 141 passes up through and stops against the bifurcated end of plate 139, and is held in this position by spring 144 also secured to plate 139. On the opposite end of part 132 is secured the plate 150 having a journal portion 151 in which is pivotally mounted the sheet-carrying finger 155. A spring 156 is pivotally mounted in a forked bearing 153 depending from plate 150, and bears at its other end on an extended portion 157 of the finger 155, serving to hold it in an upright position in contact with projection 152 of plate 150. A sliding bar 160 has a pin 161 in position to be moved into and out of contact with the inclined and elevated portion of spring 156 to apply pressure intermittently. Bar 160 slides in a bearing in the side of the conveyer, is held frictionally by the plate 164, and has a projection 162 working in a notch 154 in plate 150, serving to limit its motion in both directions. On the other end of bar 160 is adjustably mounted a contact piece 165, clamped on the bar by the gib 166 and screws 167—167; a projection 168 contacts with hook 141 to throw it down to dotted position shown in Fig. 14 when the bar is moved, at which time the pin 161 is moved out of contact with spring 156 allowing finger 155 to drop to dotted position. For convenience in setting contact piece 165 in proper relation to hook 141 a projection 169 is provided to abut against a shoulder 145 on plate 139. (Figs. 13 and 14 show the carriage as it is seen from the rear of the machine, as would be the case in Fig. 1). The conveyer receives its motion back and forth across the machine from a cable 170, to which it is attached by clamp plate 171 and screws 172—172. Cable 170 is connected at one end to arm 178 rigidly secured to main rock shaft 50, passes around pulleys 173, 174 and 175 pivoted on the frames of the machine (Figs. 1 and 2) around a weighted pulley 176 depending from the cable, and is secured at its other end to bracket 177 on the side frame.

Secured to the upper portion of bar 121 are the bearings 180—180 (Figs. 19, 20 and 22), in which is journaled the rock shaft 181. Shaft 181 is operated through arm 182, pitman 183, arm 184, and cam 185 mounted on main shaft 9, and has a spring 186 tending to hold the roller against the motion of cam 185. A sheet-clipping plate 190 is loosely mounted on shaft 181, substantially central with chute 13, and is held in contact with bar 121 by spring 191 attached to a stud 192 secured to bar 121. A stud 195 is secured to shaft 181, and intermittently contacts with plate 190 to lift it slightly from bar 121 to permit the passage of sheets between it and bar 121, as they are carried along by hook 141.

When sheet 65 has been brought by hook 141 to a position opposite chute 13, between plate 190 and bar 121, it needs to be registered in proper position to be attached to sheet 70 contained in chute 13 (see Fig. 3). For this purpose the following mechanism is provided: Secured to the underside of bar 121 are the studs 200—200 and 201—201, on which are loosely journaled the swinging blocks or links 205—205 and 206—206; 207—207—207—207 are retaining collars. (Figs. 19 and 20). Plates 208—208 have studs loosely journaled in the free ends of links 205 and 206, so that when the links are oscillated the plates have a parallel motion. Springs 202—202 on studs 201—201 through links 206—206 tend to hold plates 208—208 normally in contact with stop pins 204—204. Loosely journaled in bearings 209—209—209—209 of plates 208 are the small rock shafts 210—210, secured to which are the U-shaped finger carrying frames 211—211, and also the arms 212—212. The utility of frames 211 will be seen in Figs. 19, 20, 21, it being seen that these frames have to first swing to the left to the dotted position in Fig. 20 before they move on the parallel links 205, 206 to effect the registering of the sheet 65. The U-shape of the frame allows them to clear the pivots 200, 201 and the links 205, 206, and associated parts, in swinging up into the plane of the sheet which is to be registered by the next movement of the frame 211 and the registering finger carried thereby. Frames 211 are held in contact with the stop 213 on plate 208 (dotted lines in Fig. 20) by springs 215—215, and receive an oscillatory motion in a vertical plane from the tappet heads 216—216 acting on arms 212—212. Frames 211 have the rigidly mounted notched pins 219—219, on which are adjustably mounted the sheet registering fingers 220—220 (Fig. 21) which are held in position by the socket portion 221 and the clip spring 222, the end of the latter fitting into the different notches, which represent various lengths of sheets. Tappet heads 216 are mounted on connecting rods 218—218, which work freely through the swivel studs 226—226 pivoted in links 205, and which receive motion through arms 229—229, cams 230 and 231 mounted on main shaft 9, and springs 232—232. (Figs. 1 and 2).

The operation of the conveying, registering and sheet supporting mechanism just described, is as follows: When the sheet 65 has been separated and carried downward by the jaws 93 and 95 and deposited upon the plate 125, and is resting against bars 120 and 121, the conveyer 140 will have nearly reached the limit of its motion in one direction (toward the left in Fig. 3), at which time the sliding bar 160 will contact with the side frame 1; the continued slight motion of conveyer 140 will cause the projection 168 of part 165 mounted on the sliding bar 160 to be freed from contact with hook 141, and hook 141 will be raised by spring 144 into its upper position. The return motion of conveyer 140 then begins, and hook 141 contacts with sheet 65, and the conveyer, hook and sheet travel across the machine together to a position opposite the chute containing sheets 70, the sheet 65 passing under the guide finger 129 on block 128, and under plate 190, and its lower edge passing from slotted plate 125 to presser 130. As the conveyer nears the side frame on the right in Fig. 3 the end of the sliding bar 160 contacts with the side frame, and the slight continued motion of the conveyer 140 causes the projection 168 of part 165 to force hook 141 downwardly, against the tension of spring 144, freeing it from sheet 65, which then ceases its movement. During the passage of sheet 65, the frame 211 and finger 220 are depressed out of the path of the sheet as shown in Fig. 20, but immediately thereafter, by the withdrawing of tappet 216, assume the position shown in dotted lines in Fig. 20. By the further withdrawing of tappet 216 and its contact with stud 226 the links 205 and 206 are rocked and the sheet registering finger 220 is caused to contact with one end or the other of the sheet, according to the direction in which it is desired to move the sheet to register it.

The choice of direction in which to move the sheet to register it is governed by the nature of the work to be done, as it may be desired to attach sheet 65 to either the back or the front side of sheet 70, and as it is customary in hand work and most practical to register the sheets from the head, the sheets 65 and 70 are so placed in their receptacles as to have the heads in the direction to most easily accomplish the desired end. Thus it will be understood that simply by reversing the position of the sheets in their receptacles either sheet may be presented in any desired relation to the other sheet, without adjustment of mechanisms other than securing the registering finger to the proper one of the actuating mechanisms. This ease in altering the relative position of the sheets is an element of great advantage in the operation of such a machine, as it is customary in the art with few exceptions to make frequent changes in the nature of the work to be done. The curved path of travel of the registering finger is to settle the sheets firmly against the surface of the presser 130 as well as to push it endwise to proper position, as it has been found in practice that a straight motion of the registering finger tends to lift the end of the sheet it is moving, or throw it out of parallel which interferes with the accurate register of the back or lower edge. After the sheet 65 has been properly registered the plate 190 is permitted by the rocking of rock shaft 181 and the action of spring 191 (Fig. 22) to clip and securely hold the sheet 65 against bar 121. Sheet 65 is now ready to have the paste applied to it. As illustrated in the drawings the contact piece 165 may be set out of operative connection with hook 141, so that hook 141 always remains in its upper position, and will serve in one direction to register sheet 65, in which case the registering mechanism on that side need have but one motion, to register the sheet 70 in its turn. The hook 141 thus registers one sheet independently of the registration given the other sheet by whichever one of the registering fingers 220 is being used.

Another means for independently registering the sheets is constituted by the registering fingers 220 carrying the blocks 405, (Figs. 33, 34, Sheet 9). As shown in Fig. 4, Sheet 4, the lower edges of sheets 65 and 70 are resting loosely on the presser 130, but the sheets are inclined to each other. Sheet 65 under finger 129 has been registered, and is now held against bars 120, 121 by plate 190. Sheet 70 is above finger 129 and plate 190, and is sufficiently separated from sheet 65 above bar 121 so that the finger 220, in Fig. 34 can register one sheet, (for example 65) as it is delivered, and before it is clamped by plate 190. The block 405 on the same finger independently registers the other sheet, as 70, as it is delivered, owing to the separation between the sheets at bar 121, on which the registering fingers 220 and blocks 405 carried thereby are mounted. Of course the registration block 405 will be so positioned as not to strike both sheets where one is to be registered inside the other. Also, the same finger can independently register the edges of both sheets in the same line where desired, as in Fig. 21, Sheet 9. This independent registration can be done either at the head or at the foot of the sheets, according to the position and motion of fingers 220. In Fig. 33, the top sheet, 70, will be registered by block 405, inside the bottom sheet 65, while in Fig. 34, the reverse is the case owing to the reversing of block 405.

*Pasting mechanism.*—For the purpose of applying paste to the sheets 65 the following mechanism is provided: A paste receptacle 240 (Figs. 22 and 23) is mounted on a bracket 241 and cross rod 242, or upon any other suitable supports, and contains a paste supply roller 245, and an adjustable scraper 246, for regulating the thickness of the film of paste upon the paste supply roller; paste roller 245 is intermittently rotated through pawl 248 pivoted on arm 48 secured to rock shaft 50. Secured to rock shaft 50 is also another arm 47, and in the free ends of arms 47 and 48 is pivoted the short rock shaft 250, having the arms 251—251 (Figs. 24 and 25)

on the free ends of which is detachably mounted the reversible paster bar 252. Paster bar 252 is reversible, having opposite serrated edges, and has near its ends the pins 253—253, fitting loosely into depressions in the ends of arms 251—251, and held yieldingly by springs 255—255 bearing against hooks 256—256, loosely secured at their lower ends to arms 251—251. Shaft 250 is rocked in one direction through arm 258 carrying stud 257 and spring 259 attached to stud 257 and shaft 50. On shaft 250 is rigidly mounted the arm 260 carrying stud 261, roller 262, and contact face 263 (Fig. 23) which contacts at times with adjustable plate 298 to regulate the width of the strip of paste applied to sheet 65. Stud 261 at certain times engages one or the other of notches 265 and 266 in plate 267, which is pivoted in arm 48 and has a projection 268 bearing against a stop pin 270 on pawl 51; it is retained by spring 271. Roller 262 on arm 260 runs on cam plate 280 secured to the presser 130 and also occasionally on the rocking cam 275. The latter is secured to a short rock shaft 276 journaled in block 128, rock shaft 276 having at its other end the finger 277. Rocking cam 275 is actuated in one direction by a spring 279, and in the opposite direction by connecting rod 281 with a bent end, rod 281 working freely in a slot in the end of an arm 184 pivotally mounted on cross rod 242 and actuated by cam 185 (Figs. 22 and 23.) Arm 184 actuates connecting rod 281 only when near the limit of its motion in one direction, and serves to rock the cam 275 and lift the finger 277 so that the sheet 65 may pass freely under it; when released by the opposite motion of arm 184, finger 277 rests by the tension of spring 279 upon sheet 65, and in this position cam 275 would be out of the path of roller 262 on arm 260. If, however, sheet 65 were missing from any cause, such as the exhaustion of the supply in the receptacle, finger 277 would pass through the path of sheet 65 and stop against pin 283 in bar 120, in which position cam 275 would be in the path of roller 262 during its descent, and through it would prevent the paster bar 252 from contacting with cross bar 120 and applying paste thereto. Attached to rock shaft 250 are fingers 285, (Fig. 4) the ends of which are beveled to contact at a proper angle with the points 100 of the movable jaws 95 (Figs. 10 and 24); when a sheet is clipped between jaws 95 and 93 point 100 is held outside the arc of the movement of the beveled end of finger 285; but if no sheet is between jaws 95 and 93, point 100 passes within the arc of the movement of the beveled end of finger 285 which engages it and prevents rock shaft 250 from rotating about its center to permit paster bar 252 to contact with sheet 65 and apply paste thereto. Thus it will be seen that the machine will neither apply paste to the supporting bar 120 in case sheet 65 is missing, avoiding any necessity for stopping the machine to clean it, as would otherwise be the case, nor will the machine apply paste to sheet 65 in case sheet 70 is not between the jaws 93 and 95 ready to be brought down upon and secured to sheet 65; thus sheet 65 is not spoiled nor accidentally attached to other sheets. It will be further understood that, as shaft 50 continues its downward rotation, when sheet 70 is missing from jaws 93 and 95, the paster bar is restrained not only from acting to apply paste, but also from contacting with paste supply roller 245. This is also the case when sheet 65 is missing, for as roller 262 runs over and off the lower end of rocking cam 275 the stud 261 catches in notch 266 of plate 267 and supports the paster bar out of contacting position with the paste supply roller 245. Furthermore, it will be apparent, that if the machine were started accidentally without a supply of sheets in the receptacles, or run without sheets for the purpose of oiling, or otherwise, that the paster bar would neither contact with the paste supply roller 245 to take paste nor attempt to apply paste to the bar 120.

The cam plate 280 would hold the paster bar out of position to apply paste to sheet 65 as in Fig. 2 were it not for the fact that as rock shaft 50 begins its downward movement the cam plate 280 and presser 130 are withdrawn through the action of arm 286, rock shaft 287, and arm 288 acting on cam 290 (Fig. 22). The presser is supported at one end by the roller 402, which runs on the sliding cam 300, supported by suitable bearings on the side frame, and operated by arm 301 on rock shaft 50 Figs. 2, 31 and 32. Assuming sheet 65 to be in proper position to be pasted, and sheet 70 to be held by the jaws 93 and 95, rock shaft 50 will begin its downward movement presser 130 and cam plate 280 will be gradually withdrawn, and paster bar 252 will approach sheet 65; as it nears it, the contact face 263 of arm 260 will contact with the adjustable plate 298 on block 128 and the paster bar will be drawn along in a line substantially parallel to, but without touching, sheet 65, until it reaches the end of plate 298, when the point of face 263 will drop on and apply paste to sheet 65 from the point of contact to the lower edge, the width of the strip of paste, or "tip" as it is termed in the art, being governed by the position to which the plate 298 constituting an auxiliary support for arm 260 has been adjusted by means of the screw 299. (Fig. 23.)

The function and operation of the plate 298 will be clearly seen from Fig. 23. About the center of the sheet, 263 refers to the flat bottom face of the paster arm 260 (dotted lines). The paster swings upwardly with arm 47 to above the solid position shown in Fig. 23. The flat face 263 of arm 260 drops down on the plate 298, and is supported thereby. As the arm 47 moves downwardly from its highest position, the paster arm 260 is dragged after it, being supported by the contact of the flat face 263 on 298. As 263 moves down on 298, it reaches the end and drops off on to the bar 128, thereby allowing the paster bar 252 to contact with the sheet 70 resting on the bar 120. The paster bar 252 cannot contact with the sheet 70 until after the flat face 263 of arm 260 has left the plate 298. By adjusting the plate 298 up and down on the block 128, it can be seen that the width of the "tip" will be varied, the "tip" being wider as the plate 298 is adjusted higher, and vice versa. The higher plate 298 is adjusted on block 128, the sooner the paster device touches the paper, making a wider tip. To narrow the tip, 298 is moved down on block 128.

The serrations in the edge of the paster bar permit it to be held by the action of spring 259 in firm contact with the sheet 65, the paste percolating through the interstices of the serration and applying a strip of paste of uniform thickness to the sheet, independent of the precise quantity of paste upon the paster bar; thus it is not important that paste of a particular density be used, as it is found in practice that the paste commercially supplied varies greatly in condition and it is one of the advantages of the machine that it adjusts itself to the condition of the paste. The position in which paster bar 252 is mounted on arms 251—251 causes the upper forwardmost edge or corner of the paster bar to contact with the sheet first, making a sharply defined line of paste on the sheet, and the springs 255—255, and loosely mounted hooks 256—256, permit a tilting and wiping action of the paster bar on the sheet, to insure a smooth and evenly balanced tip. As rock shaft 50 continues its downward motion and roller 262 runs down cam 280, the stud 261 will catch in notch 265 in plate 267, and at that point roller 262 will leave cam 280, and the paster bar 252 will travel in a true arc from the center of rock shaft 50 until the paster bar contacts with the paste supply roller 245 and receives a new supply of paste. By this time sheet 70 will have been deposited on presser 130 by jaws 93 and 95, and registered in final relation to sheet 65; also the arm 301 (Fig. 2) on rock shaft 50 will have pushed the sliding cam 300 forward so that its straight edge forms a path along which the roller 402 on presser 130 will travel, so that as the presser is actuated by the mechanism to which it is attached it will not only support sheet 70 but will press it into firm contact with the pasted edge of sheet 65. Upon the return or upward motion of rock shaft 50 the roller 262 will run up the cam plate 280, and release the stud 261 from the notches 266, leaving the parts free to repeat the cycle of action just described. On the upward motion the cam plate 280 through roller 262 guides the paster bar so that it will not interfere with the presser 130, which it must pass. A series of paster bars are supplied with each each machine to suit the range of sheets that may be handled by it. It is not practicable to use one long bar, as on comparatively thin sheets the bar would apply paste to the sheet supporting means, in this instance bar 120, where it extended beyond the sheet, which would interfere with the free passage through the machine of the succeeding sheets.

Fig. 31 shows the two extreme positions of the sliding cam 300. If presser 130 is operated in the direction of the arrow while sliding cam 300 is in position shown in solid lines, a roller 402 will run down the inclined face and the presser will pass in under bar 120 to the position shown in Fig. 32; in this position paster bar 252 is free to contact with the margin of sheet 65 and pass on downward toward the paste supply roller 245. With sliding cam 300 in the position shown in dotted lines in Fig. 31, action of presser 130 in the direction of the arrow will cause its shoulder to clamp against bar 120, or against sheets 70 and 65 thereon to press them together. Presser 130 presses bar 120 and the sheets thereon with a yielding pressure, being pivotally connected through its arms 284—284 with a spring held forked arm 286 (Fig. 22) loosely mounted on rock shaft 287. A torsion spring 292 (Fig. 1) held by adjusting collar 293, serves to hold arm 286 in contact with a shoulder piece 294 on stop arm 295, rigidly mounted on rock shaft 287. Rock shaft 287 is operated through arm 288, roller 289, and cam 290, with a coacting spring 291. This arrangement permits presser 130 to accommodate itself to any variation in the thickness of sheets being pasted, with a practically uniform pressure on all.

Referring again to Fig. 31, also Fig. 2, 305 is a stop block attached to the side frame, and 306 is a support for sliding cam 300; support 306 is pivoted on main rock shaft 50, and is held up firmly by expansion spring 308, encircling guide rod 311 so as to press sliding cam 300 against stop block 305 and retain it frictionally in position; 310 is an eyebolt secured to frame acting as guide for rod 311 and abutment for lower end of spring 308.

After sheets 65 and 70 have been pasted and pressed together, both presser 130, and clip plate 190 lift slightly, and sheets 65 and 70 are together expelled from the interior of the machine by the finger 155 of the carriage 132, the same motion of the carriage which brings across the succeeding sheet 65 serving to expel the already pasted sheets.

The sheets are expelled upon a platform 320 secured to the outside of the frame (Figs. 1, 2 and 30). In an opening in the platform is a rectangular plate 325 having a circular or elliptical reciprocating motion, one end resting upon a free roller 321 traveling in a support 322 attached to platform 320, and being pivoted near its opposite end to link 323 connected to a crank pin 327 on the one-revolution of shaft 9; the horizontal motion of link 323 is limited by link 324 pivoted on stationary shaft 315. It will be understood that the plate 325 at its point of junction with link 323 will have a nearly circular motion in a reverse direction from the motion of shaft 9, at one time dropping below and at another rising above the surface of platform 320, lifting the sheets which have been pushed upon it by the finger 155 of carriage 132, and by its continued motion carrying them in the direction of the arrow in Figs. 30 and 28 and depositing them in a more advanced position, step by step, upon the platform 320, each pair of pasted sheets overlapping those preceding them; thus it requires some little time for the sheets to travel the length of the platform which may be made of any desired length, and this gives them an opportunity to partially absorb the paste applied and to be fairly well secured together before being removed by the attendant, it having been found in practice that if the sheets are handled too soon there is a tendency for them to slip upon one another and disturb the accurate alinement of the edges. For this same reason I do not cause the machine to pack or crowd the sheets tightly together, but handle them as loosely and gently as possible until the paste is somewhat set, and this, the construction shown accomplishes in a most satisfactory manner; endless chains, tapes, and other devices might be used, but usually they could not be built so compactly, or in such desirable form, and it is practically impossible for the garments or person of the attendant to be caught or injured in any way while removing the finished product from the construction shown. The platform and plate 325 are so constructed in relation to the range of sizes taken by the machine as to require no adjustment for size. A plate 330, which I designate as a dropping plate, (Figs 1, 19 and 30) is secured to rock shaft 181, and at the time when the pasted sheets are being expelled from the machine serves as a support for their upper portions, standing just beyond the end of bar 121 in a plane practically coincident with its face. When the pasted sheets are fully expelled, through the rocking of shaft 181 dropping plate 330 is swung as indicated by dotted lines in Fig. 30 and permits the pasted sheets to drop flat upon plate 325 or partially upon the preceding pasted sheets thereon.

*Imperfect sheet rejecting mechanism.*—If through the action of the automatic paster tripping devices described any sheets are expelled from the machine which are not pasted, they are pushed on out to a position somewhat to one side of the pasted sheets, which differentiates them from the others so that they are easily removed uninjured, and may be returned to the receiving chutes of the machine. To accomplish this I provide a push finger 335 (Figs. 27 and 28), secured to a rock shaft 336 journaled in bearings 337 secured to the side frame beneath the platform 320. A spring 338 suitably connected serves to retract finger 335 and hold it with its point normally below the faces of bars 120 and 121 so that the sheets may pass freely over it. A hooked rod 340 is loosely connected to finger 335 at 339. A rod 341 serves to hold the hooked end of rod 340 out of engaging position with the stud 343 on bell crank 345, which is loosely journaled on the projecting end of rock shaft 287; and receives motion through its roller 346 and cam 348 secured to shaft 9. When the sheets are being properly separated, fed, registered and pasted, cam 348 and bell crank 345 operate, but without acting upon rod 340 and finger 345. When however, unpasted sheets are expelled from the machine, rod 341 is retracted and withdraws its support from rod 340, and permits it to drop into operative contact with stud 343 on bell crank 345, so that push finger 335 is actuated; owing to the position of the rock shaft 336, the contacting end of push finger 335 swings up into the path of and just behind the unpasted expelled sheet and pushes it to a position approximating that indicated by dotted lines in Fig. 28.

Rod 341 is pivotally connected to ratchet segment 350, loosely mounted on rock shaft 352 journaled in one of the side frames. A retaining pawl 354, actuated in one direction by spring 355, is secured to a rock shaft 356 journaled in the side frame, and has at its opposite end a rigid finger 357 (see Figs. 29 and 23).

359 is a stop pin extending through the side frame, against which various movable parts abut. Mounted so as to turn freely upon the inner end of rock shaft 352 is the plate 360, having a slot surrounding stop pin 359, which limits its motion, and a spring 367 which holds it in its upper position as indicated in the drawings. A stud 362 projects from one side of the plate and impinges against finger 357. On the opposite side of the plate a trip finger 364 depends from a stud 365, and bears against the flattened stud 366 projecting from plate 360; this makes finger 364 rigid in one direction of the motion of plate 360; spring 367 holds finger 364 in contact with stud 366. A connecting rod 368 is pivoted in one end of plate 360, and is connected at its other end to a counting device 370 of any well known form attached to the side frame. A curved arm 375 is secured to rock shaft 352 on the inner side of the side frame. An arm 377 is secured to the opposite end of rock shaft 352; arm 377 has pivoted to its free end a pawl 379, which is held both in and out of engagement with ratchet 350 by the weight bar 378, according to the position of arm 377. A stud 351 projects from segment 350 into the path of arm 377. 380 is the enlarged head of the pivot of pawl 379, and is used to turn it outward, out of operative position when desired.

When, through the operation of the paster tripping mechanisms, paster bar 252 is held out of position to either apply paste or contact with the paste supply roller 245, the arm 258 and its stud 257 are held during their downward and rearward movement as shown in dotted lines in Fig. 23, in which position stud 257 contacts with the end of arm 375, serving to actuate rock shaft 352 and arm 377, and through stud 351 the ratchet segment 350, the distance of one tooth; rod 341 being carried with segment 350 permits the operation of push finger 335 as already described. Pawl 354 engages with a tooth to retain ratchet segment 350 in position. During the operation just described plate 360 has not been actuated, and consequently the counting mechanism has not recorded the unpasted sheet. Assuming that the next cycle of the machine finds the sheets properly placed and pasted, stud 257 will follow the line indicated by the dotted arc in Fig. 23, in which position it will contact with trip finger 364 on plate 360, and actuate plate 360 so as to cause not only the counting device to properly record the sheets, but also through stud 362 to actuate finger 357, rock shaft 356, and pawl 354, so as to release segment 350 and cause it through rod 341 to prevent the operation of push finger 335.

The machine is provided with a belt shifting rod 385, (Figs. 27 and 28) having adjacent the pulleys a belt fork (not shown). A hand lever 387 is pivoted to a bracket 388 on cross rod 242, and pivotally connected to arm 389 on rod 385. Mounted adjacent to rod 385 and parallel therewith is the sliding rod 390, having secured thereto the forked collar 392 fitting loosely over rod 385, and also a spring 393 and a notch 394. A bar 395 loosely mounted in guides 397 and 398 on the side frame engages at its lower end with notch 394 in rod 390, thereby preventing the spring 393 from acting through collar 392 to shift rod 385 and stop the machine. A stud 353 projects from the inside of ratchet segment 350, and at certain times impinges against a shoulder 399 of bar 395. When the machine, in the course of its operation, fails successively to paste any predetermined number of sheets, the parts will act as already described to operate the ratchet segment 350 step by step, being retained at each step by the pawl 354, so that finally the stud 353 acts against the shoulder 399 and lifts bar 395 out of the notch in rod 390, permitting spring 393 to act and stop the machine. This automatic stopping will only occur when the predetermined number of sheets are missed successively, however, as the intervention of one pasting at any point short of the full number will cause ratchet segment 350 to be released and return to the starting point, as it is not desired to stop the machine because of any condition which is within its own power to remedy.

In Figs. 2 and 3 is seen a table 400, inclosed on three sides, and mounted upon the side frames, for the convenience of the attendant in supplying the machine with materials upon which to operate. In Fig. 5 is shown a follower which is placed in back of the sheets and which serves to keep them in contact with the rollers 23 and 24. This follower comprises a pair of bars 406, 407, hinged at 411 and braced apart by a spring 408. These parts are suitably connected together by cross bars, and a chain 409 is provided to prevent them from springing apart too far.

410 are weights which are carried by a pin on the base piece, any number of weights being added as desired according to the amount of pressure which the follower is to exert. It will be noted that the follower becomes of greater importance as the number of sheets diminishes, and the spring 408 is intended to yield somewhat in response to the action of the relieving mechanism.

It has been one object of my invention to make a machine not only of few working parts, but also to have them in position for easy access and convenient adjustment, and to have the path of sheets 65 and 70, and other sheets that may be added in an amplified machine, open and readily accessible to the attendant throughout all operations, so that any defective sheets may be reached or moved without stopping the machine, and the whole machine under the easy control of the attendant.

The construction shown and described, in a machine limited to two sheet receptacles, requires the attention of only one attendant, and a machine of even three sheet receptacles with two pasting mechanisms, running at normal speed, would require only one attendant, and this, taken with the automatic controlling devices and the comparatively small floor space, makes a machine of relatively great output and small running expense. The parallel arrangement of the sheet receptacles, with the transversely operating carrying mechanism, renders it possible to add to the sheet handling capacity of the machine without particular alteration of its construction, except a duplication of the mechanisms shown.

The material supplied to the machine to be acted upon is often not in the most desirable condition, it often occurring, for instance, that the sheets are either cut or folded not at perfect right angles, and the angles of any two sheets brought into juxtaposition may vary widely; it is therefore impossible to get an accurate alinement of both the back and head edges; as it is most desirable to have them accurately alined at the back edge, I purposely make the registering finger 220 narrow, so as to register the two sheets at a point only of the head edge, relatively near the back edge, thus averaging the angles, and not disturbing the alinement of the back edges, as would be the case with a wide registering finger or plate which contacted with a projecting corner of a sheet remote from its back edge. The sheet registering fingers 220 may have offset portions if desired, as in Figs. 33 and 34, which may be made detachable or adjustable if desired. It will be noticed that the finger shown in Fig. 33 has the offset portion at the outer edge, whereas the finger shown in Fig. 34 has the offset portion on the lower part of the finger. One or the other of the fingers will be used according as the top or the bottom sheet is to be alined inside of the other one, so that the adjustment of the offset portion has no effect upon the other sheet. By this means the head ends of sheets could be registered in an offset relation, to counterbalance any irregularity in the sheets, or to purposely show the sheet in that relation, as in the case of an inserted slip smaller than page size, or otherwise.

The construction and arrangement of the various parts herein shown may be modified in various ways without departing from the spirit of the invention, and I do not wish to limit myself to the precise form shown and described.

Having thus described my invention, I declare that what I claim as new and desire to secure by Letters Patent, is,—

1. The combination with means for supporting a pile of vertically disposed sheets, of means for frictionally engaging the edge of the outer sheet and bending one edge away from the pile, means for gripping said separated edge and pulling the sheet from the pile, means for stripping the sheet from the grippers, and a conveyer for engaging and moving said separated sheet away from said stripping means in a path transverse to the path of said grippers.

2. The combination with means for partially separating a sheet from a pile, of oscillating sheet-carrying grippers, a sheet stripping and supporting device permitting passage of the grippers and stripping the sheet, and means for automatically relaxing the tension of the grippers before the sheet engages said stripping device.

3. The combination with a plurality of chutes arranged side by side to contain sheets, of a plurality of means for frictionally engaging the edge of a sheet in each chute and bending it outwardly from the next sheet, a plurality of gripping devices for directly engaging the separated edges of said sheets and pulling them edgewise from the chute, slotted plates permitting passage of the gripping devices but stripping the sheets, and a horizontally moving conveyer for receiving and moving the stripped sheets from below one chute to below the next chute.

4. The combination with a chute arranged to contain sheets, of frictional edge engaging devices for partially separating one sheet at a time, grippers for engaging the separated portion of the sheet and completely separating the sheet from the chute, stationary means for stripping the separated sheet from the grippers, and a conveyer for receiving and moving the sheet laterally with respect to the motion of the grippers.

5. The combination with a plurality of inclined chutes for supporting sheets on their edges, of means for frictionally engaging the edge of the outside sheet in one chute and bending it outwardly, means for then gripping and pulling the sheet away from the chute, a stationary device for stripping the sheet from the gripping means, means for moving said sheet horizontally to beneath a second chute, means for separating a sheet from said second chute, and means for securing said sheets together.

6. The combination with jaws for separating a sheet from a pile, of stationary stripping devices, a conveyer for engaging the sheet when stripped from the jaws and carrying it a predetermined distance away from the stripping devices into predetermined relation with a second sheet, and means for positioning said second sheet adjacent the path of movement of said conveyer.

7. The combination with a sheet support, of means for delivering a plurality of sheets thereto, a conveyer for transferring one of said sheets to the other sheet, and movable means for positioning one of said sheets on said support independently of the other.

8. The combination with means for engaging and separating the edge of a sheet from a pile, of sheet gripping and carrying jaws, means for stripping the sheet from said jaws, a reciprocatory sheet conveyer having means for moving the sheet laterally in one direction, and a pasting mechanism for applying paste to the sheet during the return movement of said conveyer.

9. The combination with a sheet support, of means for delivering a sheet thereto, means for then registering said sheet to a predetermined position, means for delivering a second sheet to overlie said first sheet, and means for independently registering said second sheet with respect to said first sheet.

10. The combination with a sheet support, of means for assembling a plurality of sheets thereon in superposed relation, a pivoted finger projecting transversely to the plane of the support for engaging and registering said sheets, means for moving the finger on the pivot toward and from the sheet support to permit intermittent passage of sheets during gathering, and means for bodily swinging the finger to engage the edges of the sheets for registering them.

11. The combination with a sheet support, of means for delivering a sheet thereto, means for then registering said sheet to a predetermined position, means for delivering and independently registering a second sheet in predetermined overlying relation to said first sheet, and means for securing said sheets together.

12. The combination with a sheet support, of means for delivering a sheet thereto, means for then registering said sheet to a predetermined position, means for applying paste to said sheet, means for delivering and independently registering a second sheet in predetermined overlying relation to said first sheet, and means for pressing said sheets together.

13. The combination with a sheet support, of means for delivering a sheet thereon, means for delivering a second sheet thereon, securing means, feeding-out means, counting means, and throw-out means controlling said securing and counting means including a part in the paths of movement of said sheets to render said throw-out mechanism effective when either sheet fails to be delivered.

14. The combination with devices for engaging a free edge of a sheet and bending it outwardly from a pile, of jaws for grasping and completely separating the sheet, a stripping device for separating the sheet from the jaws, a support for the separated sheet, means for engaging and setting the sheet in a predetermined position, and a conveyer having means for engaging and moving the sheet away from said stripping device.

15. The combination with devices for engaging a free edge of a sheet and bending it outwardly from a pile, of jaws for grasping and completely separating the sheet, a stripping device for separating the sheet from the jaws, a support for the separated sheet, a reciprocating conveyer having means for engaging and moving the sheet away from said stripping device, and means for engaging and setting the sheet in a predetermined position during the return of the conveyer, said conveyer having a movable sheet shifting device which is thrown out of operation during the return movement.

16. The combination with sheet gathering and supporting mechanism, of means adjustable to register the sheets on either of opposite edges as desired, substantially as described.

17. The combination with sheet gathering and supporting mechanism, of registering mechanisms for opposite edges of a sheet, and a contact finger which can be used for either of opposite edges, substantially as described.

18. The combination with sheet carrying jaws, of a stationary stripping device, a conveyer for moving a sheet away from the stripping device, means for gathering a second sheet to said first sheet comprising a second set of jaws and a stripping device, means for securing said sheets together, and means controlled by said jaws for throwing said securing means out of operation when any sheet fails to be delivered by the jaws.

19. The combination with sheet carrying jaws, of a stationary stripping device, a conveyer for moving the sheet away from the stripping device, means for gathering a second sheet to said first sheet comprising a second set of jaws and a stripping device, means for applying paste to one of said sheets and pressing them together, and means controlled by said jaws for throwing said paste applying means out of operation when any sheet fails to be delivered by said jaws.

20. The combination with means for supporting a pile of sheets, of means moving transversely to the edges of the sheets in said pile for engaging the edge of the outer sheet and bending it away from the pile, movable jaws for gripping the separated portion of the sheet and pulling it out of the pile, means for automatically relaxing the tension of said jaws after the sheet is separated, means for stripping the sheet from the jaws, and means for feeding the sheet away from said stripping means.

21. The combination with a bodily movable pasting mechanism, of a support for the sheets to be pasted, an auxiliary support for holding said pasting mechanism out of contact with a sheet on the sheet support, and means for adjusting said auxiliary support to vary the period of holding the pasting mechanism out of contact with the sheet to be pasted.

22. The combination with a sheet support, of a bodily and pivotally movable pasting device, an auxiliary support for holding said pasting device against pivotal movement toward said sheet support during a portion of the bodily movement, and means for adjusting said auxiliary support to vary the contact of the pasting device with the sheet.

23. The combination with a sheet support, of a bodily and pivotally movable pasting device, an auxiliary support for holding said pasting device against pivotal movement toward said sheet support during a portion of the bodily movement, means for adjusting said auxiliary support to vary the contact of the pasting device with the sheet, and means holding said pasting device away from said sheet support when a sheet is not on said support.

24. The combination with a sheet separating mechanism comprising a plurality of movable jaw devices for pulling a sheet from a pile, of assembling mechanism for grouping a plurality of sheets, means for counting the groups of assembled sheets, and means controlled by the jaw devices for preventing operation of the counting means when a sheet of any group fails to be gripped by the jaw devices.

25. The combination with a sheet separating mechanism comprising a plurality of movable jaw devices for pulling a sheet from a pile, of assembling mechanism for a plurality of sheets, means for counting the groups of assembled sheets, means controlled by the jaw devices for preventing operation of the counting means when a sheet of any group fails to be gripped by the jaw devices, and means controlled by the jaw devices for automatically stopping the machine after a predetermined number of sheets fail to be separated by said jaw devices.

26. In a gathering machine, the combination with a plurality of supports arranged side by side for piles of sheets, of a plurality of sheet separating mechanisms coöperating therewith, a sheet support extending parallel to said pile supports for receiving separated sheets, means for intermittently moving said separated sheets longitudinally of said sheet support and successively opposite said separating mechanisms, and means for independently positioning one of the sheets.

27. In a gathering machine, the combination with a plurality of supports arranged side by side for piles of sheets, of a plurality of sheet separating mechanisms coöperating therewith, a sheet support extending parallel to said pile supports for receiving separated sheets, reciprocating means for intermittently moving said separated sheets longitudinally of said sheet support and successively opposite said pile supports, said means having movable sheet engaging fingers, means automatically throwing said fingers out of operation during the return movement of said means to prevent displacing separated sheets, and means for independently positioning one of the sheets.

28. The combination with sheet assembling means, of means for applying paste to a sheet, movable means normally holding said pasting means from paste applying position, and sheet controlled means for controlling said holding means.

29. The combination with a plurality of sheet-separating mechanisms, of means for assembling the sheets, pasting means, a movable support for normally holding said pasting means from paste applying position, a finger movable with said support and lying normally across the path of movement of a sheet, said finger being moved upon passage of a sheet to abnormal position and thereby moving said support to inoperative position.

30. The combination with two sheet magazines, of sheet pulling devices for simultaneously separating sheets from said magazines and depositing them on a sheet support, a sheet support, a conveyer reciprocating thereon for carrying the sheet discharged by one of said sheet pulling devices to the discharge point of said other sheet pulling device, means for registering and for applying paste to said conveyed sheet, means for pressing said sheet and the succeeding sheet from said second magazine together, and means on said conveyer for feeding said pasted sheets out simultaneously with the transfer of the succeeding sheet to the point at which it is registered and pasted.

31. The combination with a plurality of supports for piles of sheets, of means for frictionally engaging the edge of the outside sheet of each pile and bending it outwardly, movable gripper devices for grasping and pulling the bent sheets from the respective piles, means for stripping the sheets from the gripper devices, a reciprocating conveyer for gathering the separated sheets to form signatures, means for discharging the signatures, and means for separating complete from incomplete signatures.

32. The combination with a plurality of devices for separating individual sheets from a plurality of piles, of a reciprocating conveyer for gathering said sheets in signatures, means for pasting said sheets together, means whereby the pasting mechanism is prevented from applying paste in case any sheet fails to be fed, and means whereby such incomplete signature is fed a different distance than a complete signature.

33. The combination with a plurality of devices for separating individual sheets from a plurality of piles, of a reciprocating conveyer for gathering said sheets in signatures, means for pasting and counting complete signatures, and means whereby the pasting mechanism is prevented from applying paste and the counting mechanism is thrown out of action by an incomplete signature, and means for feeding the imperfect signature a different distance than a complete signature.

34. The combination with a reciprocating sheet conveyer, of grippers and stripping means for delivering a sheet thereto, a support for receiving a sheet from said conveyer, means for registering said sheet to have one edge in a predetermined position, means for delivering and independently registering another sheet on said support in predetermined relation to said first sheet, means for applying paste to one of said sheets before the second is delivered and means for pressing the sheets together after the paste is applied.

35. The combination with a reciprocatory conveyer, of sheet moving devices mounted thereon, a sheet support, means for throwing said devices out of operation during movement of the conveyer in one direction, means for registering the sheet, means for positively holding the sheet against any displacement after it has been registered, and means for feeding a second sheet to overlie said first sheet.

36. The combination with a sheet support, of means for discharging a sheet thereon, means for registering said sheet, means for holding it in registered position, means for supplying a second sheet, means for pasting them together, and means for feeding them out of the machine.

37. The combination with a sheet support, of means for discharging a sheet thereon, a conveyer moving adjacent said support and engaging said sheet to move it from said discharge point to a predetermined point, means for applying paste to said sheet, means for feeding another sheet to overlie said pasted sheet, means for pressing said sheets together, and means carried by said conveyer for feeding said pasted sheets out simultaneously with the bringing of the next sheet to pasting position.

38. The combination with a sheet support, of means for discharging a sheet thereon, a conveyer moving adjacent said support and engaging said sheet to move it from said discharge point to a predetermined point, means for registering said sheet, means for applying paste to said sheet, means for feeding another sheet to overlie said pasted sheet, means for pressing said sheets together, and means carried by said conveyer for feeding said pasted sheets out simultaneously with the bringing of the next sheet to pasting position.

39. The combination with a reciprocating sheet conveyer, and a sheet support, of a finger carried by said support extending in the direction of movement of the sheet and normally projecting across the path of movement of the sheet, and sheet uniting means controlled by said finger.

40. The combination with a support, of a plurality of means for simultaneously discharging sheets thereon, a reciprocating conveyer for simultaneously moving said sheets from one discharge point to another on said support, a paster for then applying paste to one of the conveyed sheets, the sheets being discharged on said support and the paster being actuated during the return movement of said conveyer, and means for applying a second sheet to said pasted sheet.

41. The combination with a support, of reciprocating means for simultaneously discharging sheets thereon at separated points, a reciprocating conveyer for simultaneously moving said sheets step by step in one direction to overlie one another, and means for applying paste to one of the conveyed sheets during the return movements of the conveyer and the sheet-discharging means, whereby the pasted sheet will be attached to the next overlying sheet discharged by the corresponding sheet discharging device.

In testimony whereof I affix my signature. in presence of two witnesses.

WILLIAM F. MARRESFORD.

Witnesses:
JULIAN S. WOOSTER,
GEO. A. HOFFMAN.